US011348474B2

(12) United States Patent
Venkataraman et al.

(10) Patent No.: US 11,348,474 B2
(45) Date of Patent: May 31, 2022

(54) AUTOMATION ARCHITECTURE FOR COMPLIANCE WITH AIR TRAFFIC CLEARANCES

(71) Applicant: HONEYWELL INTERNATIONAL INC., Morris Plains, NJ (US)

(72) Inventors: Vijay Venkataraman, Excelsior, MN (US); Benjamin Lee Johnson, Brooklyn Park, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 338 days.

(21) Appl. No.: 16/534,537

(22) Filed: Aug. 7, 2019

(65) Prior Publication Data
US 2021/0043095 A1 Feb. 11, 2021

(51) Int. Cl.
*G08G 5/00* (2006.01)
*G10L 15/18* (2013.01)
(Continued)

(52) U.S. Cl.
CPC ......... *G08G 5/0047* (2013.01); *G08G 5/0013* (2013.01); *G08G 5/0026* (2013.01);
(Continued)

(58) Field of Classification Search
USPC ........ 704/1–10, 200–277; 719/310, 311–332
See application file for complete search history.

(56) References Cited

U.S. PATENT DOCUMENTS 7,848,877 B2   12/2010   Goodman et al.
8,571,586 B2   10/2013   McGuffin et al.
(Continued)

FOREIGN PATENT DOCUMENTS

EP   3432294 A1   1/2019
FR   2913799 A1   9/2008

OTHER PUBLICATIONS

Adbsafe, "DECLOS Digital Departure Clearance System," retrieved from: https://adbsafegate.com/documents/3091/en/brochure-declos-digital-departure-clearance-system, Mar. 27, 2019.
(Continued)

*Primary Examiner* — Marcellus J Augustin
(74) *Attorney, Agent, or Firm* — Lorenz & Kopf, LLP

(57) ABSTRACT

An air traffic command automation system for automating the process of listening to, interpreting, adhering to, and responding to air traffic command messages is disclosed. The system includes one or more processors configured by programming instructions on non-transient computer readable media. The system is configured to: receive an air traffic command message, from an entity other than the flight crew, that includes one or more tasks for the aircraft to perform; determine from the command message the one or more tasks for the aircraft to perform; generate a sequence of actions for each task that the aircraft can undertake to accomplish the task; verify the coherence, feasibility, and safety of the actions; relay an interpretation of the command message to the command message originator; preview the verified sequence of actions with the flight crew; and issue commands to execute actions at appropriate points during a mission.

20 Claims, 3 Drawing Sheets

(51) Int. Cl.
   *G10L 15/22* (2006.01)
   *G06F 3/0484* (2022.01)
   *H04L 67/12* (2022.01)

(52) U.S. Cl.
   CPC .......... *G10L 15/1822* (2013.01); *G10L 15/22* (2013.01); *G06F 3/0484* (2013.01); *G10L 2015/223* (2013.01); *H04L 67/12* (2013.01)

(56) References Cited

U.S. PATENT DOCUMENTS

| | | | |
|---|---|---|---|
| 8,751,061 B2 | 6/2014 | Coulmeau et al. | |
| 9,430,949 B1 | 8/2016 | Nelson et al. | |
| 10,026,324 B2 | 7/2018 | Shamasundar et al. | |
| 10,127,821 B2 | 11/2018 | Balasubramanian et al. | |
| 10,157,617 B2 | 12/2018 | Shamasundar | |
| 10,204,430 B2 | 2/2019 | Gowda | |
| 10,426,393 B2* | 10/2019 | Bosworth | B64C 13/02 |
| 11,107,360 B1* | 8/2021 | Kimchi | G01S 13/878 |
| 2003/0093187 A1* | 5/2003 | Walker | B64D 45/0034 |
| | | | 701/1 |
| 2015/0162001 A1 | 6/2015 | Kar et al. | |
| 2016/0196750 A1* | 7/2016 | Collins | G08G 5/0086 |
| | | | 701/14 |
| 2016/0247406 A1* | 8/2016 | Khatwa | G01S 19/51 |
| 2017/0124734 A1* | 5/2017 | Gowda | G06T 11/60 |
| 2017/0365177 A1 | 12/2017 | Puentes et al. | |
| 2018/0061243 A1* | 3/2018 | Shloosh | G08G 5/0091 |
| 2018/0129635 A1 | 5/2018 | Saptharishi et al. | |
| 2018/0233052 A1 | 8/2018 | Shamasundar et al. | |
| 2018/0268718 A1 | 9/2018 | Srivastav et al. | |
| 2019/0096267 A1* | 3/2019 | Shamasundar | G08G 5/0013 |

OTHER PUBLICATIONS

Cordero, Jose Manuel et al., "Automated Speech Recognition in ATC Environment," ATACCS Research Papers, May 2012, retrieved from: https://pdfs.semanticscholar.org/dcea/e274aa3f864a99d62ce5778ac48294b4d74f.pdf.

Airport Technology, "The Role of Automation in Air Traffic Control," Jul. 11, 2018, retrieved from: https://www.airport-technology.com/features/automation-air-traffic-control/.

* cited by examiner

AUTOMATION ARCHITECTURE FOR COMPLIANCE WITH AIR TRAFFIC CLEARANCES

STATEMENT REGARDING FEDERALLY SPONSORED RESEARCH OR DEVELOPMENT

This invention was made with Government support under contract number FA8650-17-C-2210 awarded by the Air Force Research Laboratory. The Government has certain rights in this invention.

TECHNICAL FIELD

Embodiments of the subject matter described herein relate generally to air traffic communication. More particularly, embodiments of the subject matter relate to automating an aircraft's response to air traffic command messages.

BACKGROUND

Listening and responding to air traffic command messages can place significant cognitive stress on pilots, particularly in high-traffic areas (such as terminal areas) where the pilot must quickly and accurately parse numerous messages—many of which may not apply to that aircraft. This cognitive load can cause a pilot to make mistakes when processing and interpreting important air traffic voice messages and lead to costly delays (e.g., missed approach). The inherent risks and costs involved in air traffic routing and control make it imperative that air traffic commands are quickly, accurately, and safely processed and acted on. New systems and methods for reducing pilot workload can aid the advancement toward single pilot and autonomous flight operations.

Hence, it is desirable to provide a system and method for automating the response to air traffic command messages. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An air traffic command automation system on an aerial vehicle for automating the process of listening to, interpreting, adhering to, and responding to air traffic commands is disclosed. The system includes one or more processors configured by programming instructions on non-transient computer readable media. The system is configured to: receive an air traffic command message directed to the aerial vehicle, from an entity other than flight crew on the aerial vehicle, that includes one or more tasks for the aerial vehicle to perform; determine from the air traffic command message the one or more tasks for the aerial vehicle to perform; generate a sequence of actions for each task that the aerial vehicle can undertake to accomplish the task; verify the coherence, feasibility, and safety of each action individually and together; relay an interpretation of the air traffic command message to the air traffic command originator; preview the verified sequence of actions with the flight crew; and issue commands to execute actions at appropriate points during a mission.

A processor-implemented method in a vehicle for automating the process of listening to, interpreting, adhering to, and responding to air traffic commands is disclosed. The method includes: receiving, by the processor, an air traffic command message directed to the vehicle, from an entity other than the flight crew, that includes one or more tasks for the vehicle to perform; determining, by the processor, from the air traffic command message the one or more tasks for the vehicle to perform; generating, by the processor, a sequence of actions for each task that the vehicle can undertake to accomplish the task; verifying, by the processor, the coherence, feasibility, and safety of each action individually and together; relaying, by the processor, an interpretation of the air traffic command message to the command message originator; previewing, by the processor, the verified sequence of actions with the flight crew; and issuing, by the processor, commands to execute actions at appropriate points during a mission.

Non-transient computer readable media encoded with programming instructions configurable to cause a processor to perform a method is disclosed. The method includes: receiving an air traffic command message, from an entity other than the flight crew, that includes one or more tasks for an aerial vehicle to perform; determining from the air traffic command message the one or more tasks for the aerial vehicle to perform; generating a sequence of actions for each task that the aerial vehicle can undertake to accomplish the task; verifying the coherence, feasibility, and safety of each action individually and together; relaying an interpretation of the air traffic command message to the command message originator; previewing the verified sequence of actions with the flight crew; and issuing commands to execute actions at appropriate points during a mission.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1:
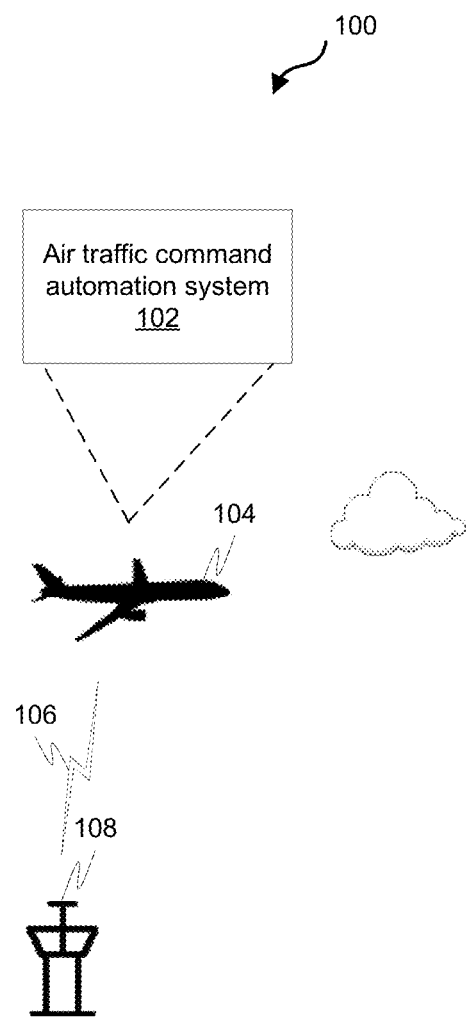
FIG. 1 is a diagram depicting an example operating environment for an example air traffic command automation system, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module"

refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for automating an air traffic command interface in an aerial vehicle in a manner that allows the pilot or operator of the aerial vehicle to easily and intuitively monitor and, if necessary, change the aircraft's response. Apparatus, systems, techniques and articles provided herein can allow for automated responses to air traffic voice messages to be performed in a demonstrably safe manner. Apparatus, systems, techniques and articles provided herein can allow for the presentation of a proposed automated response to the flight crew to be presented in an intuitive manner (e.g., so that a pilot may be able to quickly and accurately interact with it). Apparatus, systems, techniques and articles provided herein can be configured to interface with current aircraft control technology (e.g., to reduce the cost of installation).

Apparatus, systems, techniques and articles provided herein can receive air traffic control (ATC) command messages in the form of voice messages or Controller-Pilot Data Link Communication (CPDLC) messages, interpret them, and generate a sequence of "actions" that are comparable to the actions that would be taken by a pilot (e.g., setting the altitude, changing speed, etc.) that an aircraft can undertake to accomplish tasks assigned via the ATC command message. By decomposing complex tasks into simple actions, apparatus, systems, techniques and articles provided herein can interface with an existing autopilot computer to provide automated control of an aircraft.

Decomposing complex tasks into simple actions may also allow for the intuitive presentation of the plan to the pilot for approval or monitoring. In generating the plan, apparatus, systems, techniques and articles provided herein can check the received command for coherence (e.g., a "descend" command from ATC should provide an altitude that is lower than the aircrafts current altitude), feasibility (e.g., a command to change the speed of the aircraft should provide a value that is within the operating speeds of the aircraft), and safety (e.g., simultaneous speed and altitude changes must not cause the aircraft to stall).

Apparatus, systems, techniques and articles provided herein can provide an architecture that is both configurable and expandable. Apparatus, systems, techniques and articles provided herein can be configured to present a generated plan of actions to the pilot for approval before enacting it, or it can be configured to automatically relay and enact all or part of the plan without the need for pilot approval (e.g., changes to internal states such as the ATIS code or altimeter setting could be set automatically, while changes to the physical state of the aircraft such as speed or altitude could require pilot approval). The decomposition of complex tasks into a sequence of simple actions provided by apparatus, systems, techniques and articles described herein can allow new tasks to be added simply by creating a new "recipe" for that task that uses already existing components—the coherence, feasibility, and safety checks incorporated in the simpler tasks are automatically included in the new complex task.

Apparatus, systems, techniques and articles provided herein can provide a relatively low-cost solution for automating a significant portion of an aircraft's interactions with air traffic command messages. Doing so can reduce the cognitive load on pilots, providing faster and more reliable responses to ATC commands. This, in turn, can reduce the costs incurred by mistakes and delays in aircraft routing and control.

FIG. 1 is a block diagram depicting an example operating environment 100 for an example air traffic command automation system 102. As a vehicle 104, such as a manned aircraft or an unmanned aerial system (UAS) is traveling, the vehicle 104 may receive an air traffic command message (e.g., ATC voice command message/CPDLC message) 106 from a control entity, such as air traffic control 108. Listening and responding to ATC command messages can place a significant cognitive stress on pilots or operators (e.g., in the case of a UAS), particularly in high-traffic areas (such as terminal areas) where the pilot/operator must quickly and accurately parse numerous messages—many of which may not apply to that aircraft. The cognitive load has the potential to cause costly delays or mistakes by the aircraft's pilot/operator in the processing and interpretation of important ATC command messages. The inherent risks and costs involved in air traffic routing and control make it imperative that ATC command messages are quickly, accurately, and safely processed and acted on.

To reduce pilot/operator workload, the air traffic command automation system 102 is provided in the vehicle 104. The air traffic command automation system 102 is configured to automatically comply with and respond to air traffic commands in a quick, accurate and safe manner.

Figure 2:
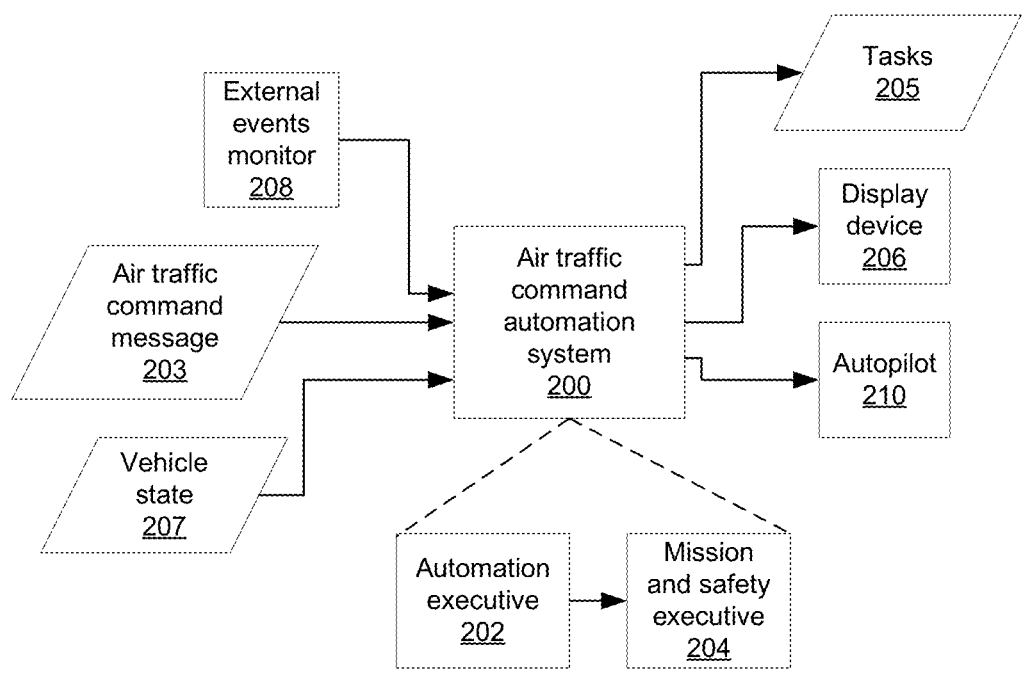
FIG. 2 is a block diagram depicting an example air traffic command automation system for automating the process of listening to, interpreting, adhering to, and responding to air traffic command messages, in accordance with some embodiments.

FIG. 2 is a diagram depicting an example air traffic command automation system 200 for automating the process of listening to, interpreting, adhering to, and responding to air traffic command messages. The example air traffic command automation system 200 is integrated into a vehicle such as an aircraft, to interface with voice or CPDLC services, the autopilot, the pilot's interface, and other software components (such as a detect and avoid system). The example air traffic command automation system 200 includes an automation executive 202 for listening to, interpreting, and responding to the air traffic command messages (e.g., receive CPDLC messages and process them to determine the appropriate plan of action for the aircraft) and a mission and safety executive 204 for implementing additional safety protocols before implementing tasks required by the air traffic command message (e.g., to interface with the flight crew and software systems on the aircraft to relay and, if appropriate, enact the plan).

The automation executive 202 may use an automated planning technique called Hierarchical Task Networks to decompose the incoming task(s) into a sequence of primitive actions. Each task may correspond to a possible CPDLC uplink message, and each action may correspond to a state change that can be made by the aircraft. A plan is then a mapping from an incoming task to one or more actions, in order; this mapping can make use of other simpler tasks in the decomposition of a complex task. Once a plan is generated for the incoming task(s), the actions in that plan are checked to ensure that their interactions meet specified safety conditions.

The mission and safety executive 204 is configured to take the plan that is output by the automation executive 202 and determine which actions in the plan should be enacted or passed to the pilot for approval. It also incorporates information from other software systems (e.g., Detect and Avoid) to ensure the safe flight of the aircraft, and passes appropriate inputs to the autopilot.

The example air traffic command automation system 200 includes a controller that is configured to implement the automation executive 202 and the mission and safety executive 204. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller. In one example, each of the automation executive 202 and the mission and safety executive 204 includes one or more processors configured by programming instructions on non-transient computer readable media.

The example automation executive 202 is configured to receive an air traffic command message 203 from an entity other than the flight crew (e.g., ATC), wherein the air traffic command message includes one or more tasks for the vehicle to perform. In one example, the air traffic command message 203 is a controller-pilot data link communication (CPDLC) message from ATC. In another example the air traffic command message 203 is an ATC voice message.

The example automation executive 202 is configured to determine the intent of the air traffic command message 203. In one example, to determine the intent, the example automation executive 202 is configured to identify the one or more tasks from a voice message. To identify the one or more tasks from the voice message, the example automation executive 202 may convert the voice message to text, for example, using voice recognition software, parse the text into a plurality of text sections, match text sections to a task type that is known to be contained in a CPDLC message, and adjust the task type based on the content of the text sections. In another example, to determine the intent, the example automation executive 202 is configured to identify the one or more tasks from a CPDLC message.

The example automation executive 202 is configured to generate a sequence of "actions" for each task that the aircraft can undertake. To generate the sequence of actions for each task, the example automation executive 202 may decompose each of the one or more tasks into one or more primitive actions, wherein the tasks are decomposed into individual actions that are comparable to the actions that would be taken by the pilot (e.g., setting the altitude, changing speed, etc.), which allows for the intuitive presentation of the plan to the pilot for approval or monitoring. An example of a task and corresponding primitive actions can be for the aircraft to undertake the task: "proceed direct to [position], and after passing [position] climb to [altitude]"; this task requires the aircraft to fly to the location specified by [position] and, after reaching that location, adjust its altitude to the specified value.

The example automation executive 202 is configured to check the coherence (e.g., a "descend" command from ATC should provide an altitude that is lower than the aircraft's current altitude), feasibility (e.g., a command to change the speed of the aircraft should provide a value that is within the operating speeds of the aircraft), and safety (e.g., simultaneous speed and altitude changes must not cause the aircraft to stall) of each action after generating a sequence of actions.

The example automation executive 202 is configured to generate a separate execution stream for different types of actions. The execution streams divorce independent actions from one another by treating their execution separately. This allows tasks that affect different states of the aircraft (e.g., a task that changes the altitude and one that changes the speed) to be planned for and executed independently, except where necessitated by the tasks themselves.

The example automation executive 202 is configured to relay its interpretation of the air traffic command message (retrieved tasks 205) and/or the plan of actions to the air traffic command message originator (e.g., ATC), preview the plan with the flight crew, and request flight crew approval of the plan when necessary. To relay the interpretation of the air traffic command message and/or the plan of actions, the example automation executive 202 may reply to the ATC with scripted readback for the retrieved tasks 205 and/or series of actions. To preview the plan with the flight crew, and request flight crew approval of the plan when necessary, the example automation executive 202 may present the plan of actions to the flight crew, for example, via a graphical user interface (GUI) on a display device 206.

The example automation executive 202 is configured to issue commands to execute the actions at one or more appropriate points during the mission after receiving flight crew approval of the plan of actions when necessary or automatically when flight crew approval is not required. The example automation executive 202 may generate execution event monitors for identifying events on which action execution is dependent (e.g., reaching a waypoint), evaluate event monitors based on the values of the vehicle states 207, and issue a command to execute an action when an event (e.g., determined based on vehicle states 207) on which the action is dependent occurs.

The example mission and safety executive 204 is configured to evaluate whether system states 207 indicate that action execution is appropriate when action execution is commanded by the automation executive 202 and to communicate to the flight crew that action execution has been commanded, for example, via the GUI.

The example mission and safety executive 204 is also configured to monitor external events, e.g., using an external events monitor 208, to determine if any external event would dictate not performing a commanded action. For example, an external event may be crossing a geofence wherein geofencing constraints would cause the mission and safety executive 204 to override a commanded action to prevent flying into protected airspace. As another example, an external event may be a Detect-and-Avoid (DAA) alert from a DAA sensor that can detect one or more approaching aircraft that may be an obstacle to safely performing the commanded action. Examples of DAA sensors may include a radar system, an automatic dependent surveillance—broadcast (ADS-B) sensor, a traffic alert and collision avoidance system (TCAS), and others. ADS-B is a satellite-based navigation tool in which an aircraft determines its position and then broadcasts that information, enabling other nearby airplanes equipped with the same tool to know its location. TCAS keeps an electronic eye on the sky immediately surrounding an airplane. Should another airplane with a similar device fly too close, an alert will issue. The mission and safety executive 204 may choose to deviate from the plan created by the automation executive 202, in order to react to external events.

The example mission and safety executive 204 is configured to cause the execution of an action when the system states 207 indicate that action execution is appropriate and when no external event is detected that dictates not performing the action. To cause the execution of the action, the example mission and safety executive 204 can prepare and send an appropriate input to vehicle equipment, such as the autopilot 210 to cause performance of the action. The example mission executive 204 is not only configured to check for external events before commanding new action, it is configured to override currently executing actions if an external event occurs while adhering to a given clearance.

A pilot's use of the air traffic command automation system 200 should be intuitive and require minimal effort—part of the value of the system. Once configured, the system 200 will allow the pilot to monitor the interpretation of incoming commands and (if so configured) approve the resulting plans. Notifications and warnings can be provided to the pilot via the GUI on the display device 206 in the cockpit.

The architecture is both configurable and expandable. The system can be configured to present the generated plan to the pilot for approval before enacting it, or it can be configured to automatically relay and enact all or part of the plan without the need for pilot approval (e.g., changes to internal states such as the ATIS code or altimeter setting could be set automatically, while changes to the physical state of the aircraft such as speed or altitude could require pilot approval). The decomposition of complex tasks into a sequence of simple actions allows new tasks to be added simply by creating a new "recipe" for that task that uses already existing components—the coherence, feasibility, and safety checks incorporated in the simpler tasks are automatically included in the new complex task.

Figure 3:
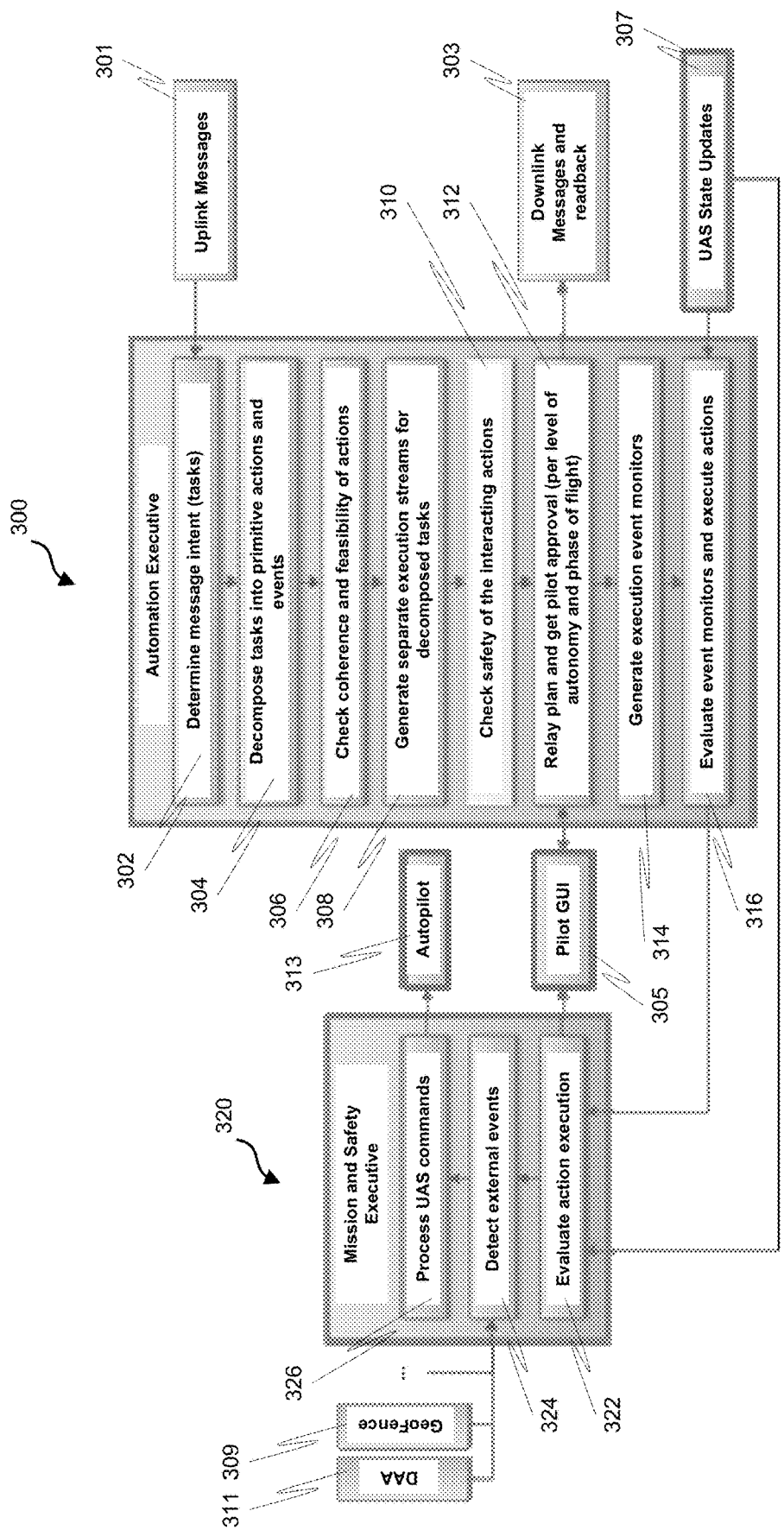
FIG. 3 is a process flow chart depicting an example process in an example automation executive and an example process in an example mission and safety executive, in accordance with some embodiments.

FIG. 3 is a process flow chart depicting an example process 300 in an example automation executive and an example process 320 in an example mission and safety executive. The order of operation within the processes 300 and 320 are not limited to the sequential execution as illustrated in FIG. 3, but may be performed in one or more varying orders as applicable and in accordance with the present disclosure.

The example process 300 includes determining the intent of an uplink message 301 (operation 302). The message 301 is an uplink message from an entity other than the flight crew (e.g., ATC), wherein the message includes one or more tasks for a vehicle to perform. In one example, the message 301 is a controller-pilot data link communication (CPDLC) voice message from ATC. In another example, the message 301 is an ATC voice message. The intent is the one or more tasks for the aircraft to perform. In one example, determining the intent includes identifying one or more tasks from the uplink message (e.g., CPDLC or voice message). Identifying one or more tasks from the uplink message may include converting a voice message to text, for example, using voice recognition software, parsing the text into a plurality of text sections, matching text sections to a task type that is known to be contained in a CPDLC message, and adjusting the task type based on the content of the text sections.

The example process 300 includes decomposing the tasks into primitive actions (operation 304). The tasks are decomposed into individual actions that are comparable to the actions that would be taken by the pilot (e.g., setting the altitude, changing speed, etc.), which allows for the intuitive presentation of the plan to the pilot for approval or monitoring The example process 300 includes checking the coherence and feasibility of actions (operation 306). Checking the coherence may include determining if the actions are logical and consistent (e.g., a "descend" command from ATC should provide an altitude that is lower than the aircraft's current altitude). Checking the feasibility may include determining if the actions are possible to do easily or conveniently (e.g., a command to change the speed of the aircraft should provide a value that is within the operating speeds of the aircraft).

The example process 300 includes generating separate execution streams for decomposed tasks (operation 308). The execution streams divorce independent actions from one another by treating their execution separately. This allows tasks that affect different states of the aircraft (e.g., a task that changes the altitude and one that changes the heading) to be planned for and executed independently, except where necessitated by the tasks themselves.

The example process 300 includes checking the safety of the interacting actions (operation 310). As an example, simultaneous speed and altitude changes must not cause the aircraft to stall.

The example process 300 includes relaying the plan and obtaining pilot approval, when necessary (operation 312). Relaying may involve relaying its interpretation 303 of the command message and/or the plan of actions to the command message originator (e.g., ATC). Obtaining pilot approval may involve previewing the plan with the flight crew, for example, via a GUI 305, and requesting flight crew approval of the plan, via the GUI 305, when necessary.

The example process 300 includes generating execution event monitors (operation 314). Generating execution event monitors may include generating execution event monitors for identifying events on which action execution is dependent (e.g., reaching a waypoint).

The example process 300 includes evaluating event monitors and executing actions when the event monitors indicate action initiation is appropriate (operation 316). Evaluating event monitors may include determining vehicle states 307, and executing actions may include issuing a command to execute an action when an event (e.g., determined based on vehicle states 307) on which the action is dependent occurs.

The example process 320 includes evaluating action execution (operation 322). Evaluating execution may involve evaluating whether system states 307 indicate that action execution is appropriate after action execution has been commanded and communicating to the flight crew that action execution has been commanded, for example, via the GUI 305.

The example process 320 includes detecting external events (operation 324). Detecting external events may include monitoring for external events, e.g., to determine if any external event would dictate not performing a commanded action. For example, an external event may be a geofencing alert, from a geofence sensor 309, wherein geofencing constraints would cause the overriding of a commanded action to prevent flying into protected airspace. As another example, an external event may be a Detect-and-Avoid (DAA) alert from a DAA sensor 311 that can detect one or more approaching aircraft that may be an obstacle to safely performing the commanded action. Examples of DAA sensors 311 may include a radar system, an automatic dependent surveillance—broadcast (ADS-B) sensor, a traffic alert and collision avoidance system (TCAS), and others.

The example process 320 includes processing UAS commands (operation 326). Processing UAS commands may involve causing the execution of an action when the system states 307 indicate that action execution is appropriate and when no external event is detected that dictates not performing the action. Causing the execution of the action may further involve preparing and sending an appropriate input to vehicle equipment, such as the autopilot 313 to cause performance of the action.

Described herein are apparatus, systems, techniques and articles for automating a significant portion of an aircraft's interactions with air traffic command messages. Apparatus, systems, techniques and articles provided herein can provide for coherence and feasibility checks during the planning process. Apparatus, systems, techniques and articles provided herein can provide for tasks to be decomposed into smaller, actionable pieces. Apparatus, systems, techniques and articles provided herein can provide for safety, coherence, and feasibility checks to be included in any level of the decomposed task, and can include component-level checks. Apparatus, systems, techniques and articles provided herein can provide that when tasks are defined using already defined tasks or actions as components, the safety checks become inherited. Apparatus, systems, techniques and articles provided herein can provide for generating independent plans (e.g., sequences of primitive actions) for each "stream" of execution, e.g., a task that affects the vertical state of the aircraft may not affect a plan for the horizontal state of the aircraft. Apparatus, systems, techniques and articles provided herein can provide for the execution of actions to be triggered by events (e.g., reaching a waypoint or a desired altitude). Apparatus, systems, techniques and articles provided herein can provide for plan execution to be automatic or require pilot approval, e.g., based on a setting for level of autonomy and phase of flight. Apparatus, systems, techniques and articles provided herein can provide a system with very minimal computational requirements. Apparatus, systems, techniques and articles provided herein can provide a system wherein the framework is easy to extend to additional tasks.

In one embodiment, an air traffic command automation system on an aerial vehicle for automating the process of listening to, interpreting, adhering to, and responding to air traffic commands is provided. The system comprises one or more processors configured by programming instructions on non-transient computer readable media. The system is configured to: receive an air traffic command message directed to the aerial vehicle, from an entity other than flight crew on the aerial vehicle, that includes one or more tasks for the aerial vehicle to perform; determine from the command message the one or more tasks for the aerial vehicle to perform; generate a sequence of actions for each task that the aerial vehicle can undertake to accomplish the task; verify the coherence, feasibility, and safety of the actions; relay an interpretation of the command message to the command message originator; preview the verified sequence of actions with the flight crew; and issue commands to execute actions at appropriate points during a mission.

These aspects and other embodiments may include one or more of the following features. The command message may comprise a controller-pilot data link communication (CPDLC) message or a voice message from air traffic control (ATC). To determine the one or more tasks for the aircraft to perform the system may be configured to identify the one or more tasks from a CPDLC or voice message. To identify the one or more tasks from a voice message the system may be configured to convert the voice message to text using voice recognition software, parse the text into a plurality of text sections, match text sections to a task type that may be known to be contained in a CPDLC message, and adjust the task type based on the content of the text sections. To generate the sequence of actions for each task, the system may be configured to decompose each of the one or more tasks into one or more primitive actions that are comparable to the actions that would be taken by the pilot. To relay an interpretation of the command message to the command message originator the system may be configured to reply to ATC with scripted readback for the command message. To preview the plan with the flight crew, the system may be configured to present the plan of actions to the flight crew via a graphical user interface (GUI). To issue commands to execute actions at appropriate point during a mission the system may be configured to generate execution event monitors for identifying events on which action execution is dependent, evaluate the event monitors, and issue commands to execute actions when an event on which the action is dependent is detected. The system may be further configured to evaluate whether system states indicate that action execution is appropriate and to communicate to the flight crew, via a graphical user interface (GUI), that action execution has been commanded. The system may be further configured to monitor external events to determine if any external event would dictate not performing a commanded action. An external event may comprise a geofencing alert or a detect-and-avoid (DAA) alert indicating that one or more approaching aircraft have been detected that may be an obstacle to safely performing the commanded action. The system may be further configured to cause the execution of an action when the system states indicate that action execution is appropriate and when no external event is detected that dictates not performing the action. To cause the execution of the action, the system may be configured to prepare and send an appropriate input to an autopilot system on the vehicle to cause performance of the action.

In another embodiment, a processor-implemented method in a vehicle for automating the process of listening to, interpreting, adhering to, and responding to air traffic commands is provided. The method comprises: receiving, by the processor, an air traffic command message directed to the vehicle, from an entity other than flight crew, that includes one or more tasks for the vehicle to perform; determining, by the processor, from the air traffic command message the one or more tasks for the vehicle to perform; generating, by the processor, a sequence of actions for each task that the vehicle can undertake to accomplish the task; verifying, by the processor, the coherence, feasibility, and safety of the actions; relaying, by the processor, an interpretation of the air traffic command message to the command message originator; previewing, by the processor, the verified sequence of actions with the flight crew; and issuing, by the processor, commands to execute actions at appropriate points during a mission.

These aspects and other embodiments may include one or more of the following features. The command message may comprise a controller-pilot data link communication (CPDLC) message or a voice message from air traffic control (ATC). The determining the one or more tasks for the vehicle to perform may comprise identifying the one or more tasks from a CPDLC message or voice message. The identifying the one or more tasks from a voice message may comprise converting the voice message to text using voice recognition software, parsing the text into a plurality of text sections, matching text sections to a task type that is known to be contained in a CPDLC message, and adjusting the task type based on the content of the text sections. The generating the sequence of actions for each task may comprise decomposing each of the one or more tasks into one or more primitive actions that are comparable to the actions that would be taken by the pilot. The relaying an interpretation of the command message to the command message originator may comprise replying to ATC with scripted readback for the command message. Previewing the plan with the flight crew comprises presenting the plan of actions to the flight crew via a graphical user interface (GUI). Issuing commands to execute actions at appropriate points during a mission may comprise generating execution event monitors for identifying events on which action execution is dependent, evaluating the event monitors, and issuing a command to execute actions when an event on which the action is dependent is detected. The method may further comprise evaluating whether system states indicate that action execution is appropriate and communicating to the flight crew, via a graphical user interface (GUI), that action execution has been commanded. The method may further comprise monitoring external events to determine if any external event would dictate not performing a commanded action. An external event may comprise a geofencing alert or a detect-and-avoid (DAA) alert indicating that one or more approaching aircraft have been detected that may be an obstacle to safely performing the commanded action. The method may further comprise causing the execution of an action when the system states indicate that action execution is appropriate and when no external event is detected that dictates not performing the action. Causing the execution of the action, may comprise preparing and sending an appropriate input to an autopilot system on the vehicle to cause performance of the action.

In another embodiment, non-transient computer readable media encoded with programming instructions configurable to cause a processor to perform a method is provided. The method comprises: receiving an air traffic command message, from an entity other than flight crew, that includes one or more tasks for an aerial vehicle to perform; determining from the command message the one or more tasks for the aerial vehicle to perform; generating a sequence of actions for each task that the aerial vehicle can undertake to accomplish the task; verifying the coherence, feasibility, and safety of the actions; relaying an interpretation of the command message to the command message originator; previewing the verified sequence of actions with the flight crew; and issuing commands to execute actions at appropriate points during a mission.

These aspects and other embodiments may include one or more of the following features. The command message may comprise a controller-pilot data link communication (CPDLC) message or a voice message from air traffic control (ATC). The determining the one or more tasks for the vehicle to perform may comprise identifying the one or more tasks from a CPDLC message or voice message. The identifying the one or more tasks from a voice message may comprise converting the CPDLC voice message to text using voice recognition software, parsing the text into a plurality of text sections, matching text sections to a task type that is known to be contained in a CPDLC message, and adjusting the task type based on the content of the text sections. The generating the sequence of actions for each task may comprise decomposing each of the one or more tasks into one or more primitive actions that are comparable to the actions that would be taken by the pilot. The relaying an interpretation of the command message to the command message originator may comprise replying to ATC with scripted readback for the command message. Previewing the plan with the flight crew comprises presenting the plan of actions to the flight crew via a graphical user interface (GUI). Issuing commands to execute actions at appropriate points during a mission may comprise generating execution event monitors for identifying events on which action execution is dependent, evaluating the event monitors, and issuing a command to execute actions when an event on which the action is dependent is detected. The method may further comprise evaluating whether system states indicate that action execution is appropriate and communicating to the flight crew, via a graphical user interface (GUI), that action execution has been commanded. The method may further comprise monitoring external events to determine if any external event would dictate not performing a commanded action. An external event may comprise a geofencing alert or a detect-and-avoid (DAA) alert indicating that one or more approaching aircraft have been detected that may be an obstacle to safely performing the commanded action. The method may further comprise causing the execution of an action when the system states indicate that action execution is appropriate and when no external event is detected that dictates not performing the action. Causing the execution of the action, may comprise preparing and sending an appropriate input to an autopilot system on the vehicle to cause performance of the action.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An air traffic command automation system on a manned aerial vehicle for automating a process of listening to, interpreting, adhering to, and responding to air traffic commands, the system comprising one or more processors configured by programming instructions on non transitory computer readable media, the system configured to:
   receive an air traffic command message directed to flight crew on the manned aerial vehicle, from an entity outside of the manned aerial vehicle, that commands the manned aerial vehicle to perform one or more tasks;
   determine from the air traffic command message the one or more tasks the manned aerial vehicle is commanded to perform;
   generate a sequence of automated actions that are analogous to pilot-performed actions for each task that the manned aerial vehicle can undertake to accomplish the task;
   verify coherence of the automated actions;
   verify feasibility of the automated actions;
   verify safety of the automated actions;
   relay an interpretation of the air traffic command message to an air traffic command message originator;
   preview the verified sequence of automated actions with the flight crew onboard the manned aerial vehicle; and
   issue commands to execute the automated actions at appropriate points during a mission.

2. The system of claim 1, wherein the command message comprises a controller-pilot data link communication (CPDLC) message or a voice message from air traffic control (ATC).

3. The system of claim 2, wherein to determine the one or more tasks for the aerial vehicle to perform the system is configured to identify the one or more tasks from a CPDLC or voice message.

4. The system of claim 3, wherein to identify the one or more tasks from a voice message the system is configured to convert the voice message to text using voice recognition software, parse the text into a plurality of text sections, match text sections to a task type that is known to be contained in a CPDLC message, and adjust the task type based on content of the text sections.

5. The system of claim 1, wherein to relay an interpretation of the command message to the command message originator the system is configured to reply to ATC with scripted readback for the command message.

6. The system of claim 1, wherein to preview the verified sequence of automated actions with the flight crew, the system is configured to present the verified sequence of the automated actions to the flight crew via a graphical user interface (GUI).

7. The system of claim 1, wherein to issue commands to execute the automated actions at appropriate points during a mission the system is configured to generate execution event monitors for identifying events on which action execution is dependent, evaluate the event monitors, and issue a command to execute the automated actions when an event on which the action is dependent is detected.

8. The system of claim 1, further configured to evaluate whether system states indicate that action execution is appropriate and to communicate to the flight crew, via a graphical user interface (GUI), that action execution has been commanded.

9. The system of claim 8, further configured to monitor external events to determine if an external event would dictate not performing a commanded action.

10. The system of claim 9, wherein an external event comprises a geofencing alert or a detect-and-avoid (DAA) alert indicating that one or more approaching aerial vehicle have been detected that may be an obstacle to safely performing the commanded action.

11. The system of claim 8, further configured to cause the execution of an action when the system states indicate that action execution is appropriate and when no external event is detected that dictates not performing the action.

12. The system of claim 11 wherein to cause the execution of the action, the system is configured to prepare and send an appropriate input to an autopilot system on the vehicle to cause performance of the action.

13. A processor-implemented method in a manned vehicle for automating a process of listening to, interpreting, adhering to, and responding to air traffic commands comprising:
  receiving, by the processor, an air traffic command message directed to flight crew on the vehicle, from an entity outside of the manned vehicle, that commands the manned vehicle to perform one or more tasks;
  determining, by the processor, from the air traffic command message the one or more tasks the vehicle is commanded to perform;
  generating, by the processor, a sequence of automated actions that are analogous to pilot-performed actions for each task that the manned vehicle can undertake to accomplish the task;
  verifying, by the processor, coherence, feasibility, and safety of an automated actions;
  relaying, by the processor, an interpretation of the air traffic command message to an air traffic command message originator;
  previewing, by the processor, the verified sequence of automated actions with the flight crew onboard the manned vehicle; and
  issuing, by the processor, commands to execute the automated actions at appropriate points during a mission.

14. The method of claim 13, wherein issuing commands to execute the automated actions at appropriate points during a mission comprises generating execution event monitors for identifying events on which action execution is dependent, evaluating the event monitors, and issuing a command to execute the automated actions when an event on which the action is dependent is detected.

15. The method of claim 13, further comprising:
  evaluating whether system states indicate that action execution is appropriate and communicating to the flight crew, via a graphical user interface (GUI), that action execution has been commanded;
  monitoring external events to determine if any external event would dictate not performing a commanded action; and
  causing the execution of an action when the system states indicate that action execution is appropriate and when no external event is detected that dictates not performing the action.

16. The method of claim 15, wherein an external event comprises a geofencing alert or a detect-and-avoid (DAA) alert indicating that one or more approaching aircraft have been detected that may be an obstacle to safely performing the commanded action.

17. The method of claim 15, wherein causing the execution of the action, comprises preparing and sending an appropriate input to an autopilot system on the vehicle to cause performance of the action.

18. Non-transitory computer readable media encoded with programming instructions configurable to cause a processor to perform a method, the method comprising:
  receiving an air traffic command message directed to flight crew on a manned aerial vehicle, from an entity outside of the manned aerial vehicle, that includes one or more tasks for the manned aerial vehicle to perform;
  determining from the air traffic command message the one or more tasks the aerial vehicle is commanded to perform;
  generating a sequence of automated actions that are analogous to pilot-performed actions for each task that the manned aerial vehicle can undertake to accomplish the task;
  verifying coherence, feasibility, and safety of the automated actions;
  relaying an interpretation of the command message to an air traffic command message originator;
  previewing the verified sequence of automated actions with the flight crew onboard the manned vehicle; and
  issuing commands to execute the automated actions at appropriate points during a mission.

19. The non-transitory computer readable media of claim 18, wherein the method further comprises:
  evaluating whether system states indicate that action execution is appropriate and communicating to the flight crew, via a graphical user interface (GUI), that action execution has been commanded;
  monitoring external events to determine if any external event would dictate not performing a commanded action; and
  causing the execution of an action when the system states indicate that action execution is appropriate and when no external event is detected that dictates not performing the action.

20. The non-transitory computer readable media of claim 18, wherein issuing commands to execute the automated actions at appropriate points during a mission comprises generating execution event monitors for identifying events on which action execution is dependent, evaluating the event monitors, and issuing a command to execute the automated actions when an event on which the action is dependent is detected.

* * * * *